3,595,779
CATALYTIC HYDROGEN CONTACT PROCESS
Reese A. Peck, Raymond F. Wilson, and Frank E. Guptill, Jr., Fishkill, N.Y., assignors to Texaco Inc., New York, N.Y.
No Drawing. Filed Mar. 28, 1969, Ser. No. 811,635
Int. Cl. C10g 31/14
U.S. Cl. 208—210
8 Claims

ABSTRACT OF THE DISCLOSURE

A catalytic hydrogen contact process for the hydrosulfurization of heavy hydrocarbon materials by introducing a heavy hydrocarbon material into a catalyst zone comprising a first catalyst zone below and a second catalyst zone above the point of entry of the heavy hydrocarbon material, in the presence of hydrogen wherein the hydrogen is introduced in countercurrent relationship to said heavy hydrocarbon material and maintained at a rate sufficient to provide for liquid contact of the second catalyst zone and recovering an increased proportion of lower boiling hydrocarbons and/or hydrocarbons of re-reduced sulfur content.

---

This invention relates to the catalytic desulfurization of heavy hydrocarbon materials, to the catalytic hydrocracking of heavy hydrocarbon materials and more particularly to a process wherein increased sulfur reduction and increased yields of lower boiling hydrocarbons and selectivity of the yields of lower boiling hydrocarbons within a particularly preferred boiling range are obtained.

Catalytic treatment of heavy hydrocarbon materials at temperatures in the range of 500 to 850° F. and elevated pressures in the presence of hydrogen to effect hydrocracking is known in the prior art. In general, prior art hydrocracking practice involves heating a heavy hydrocarbon material to the desired reaction temperature and mixing therewith, either before or after heating, the desired amount of hydrogen and then passing the mixture into the upper portion of a reactor or reactor section containing a bed of granular catalytic material. In the reactor, a liquid phase which is composed of the higher hydrocarbons from the feed containing dissolved or absorbed hydrogen passes downwardly through the reactor in contact with the catalyst together with the downflowing stream of hydrogen (e.g. a downflow process). Alternatively, the liquid feed can be introduced near the top and the hydrogen introduced near the bottom of the reactor and the vapor phase portion of the feed stream, together with stripping hydrogen and hydrogen liberated from the feed stream, can move upwardly through the upper portion of the reactor (countercurrent gas-liquid flow process).

A hydrodesulfurization process which has been proposed heretofore is to introduce a mixture of hydrogen and a wide boiling range hydrocarbon fraction into a reaction vessel containing a hydrodesulfurization catalyst at an intermediate point in the vessel, the mixture being preheated to the temperature at which the hydrodesulfurization reaction is carried out, so that the phase separation takes place at the point of introduction of the reactants. The gas phase, composed mostly of hydrogen and low boiling hydrocarbons from the feed flows upwardly through the reactor into contact with a suitable catalyst in such manner that vapor phase conversion is carried out in the total absence of any liquid, at the same time, the liquid phase composed largely of hydrocarbons in the higher boiling ranges containing dissolved hydrogen passes downwardly in the reactor over the catalyst contained therein. This process can be referred to as a split flow hydrodesulfurization process.

It is an object of this invention to improve the efficiency of such split flow hydrodedsulfurization process.

It is a further object of this invention to provide for a split flow hydroconversion process wherein increased yields of desired lower boiling hydrocarbons are obtained from the hydrocracking of heavy hydrocarbon materials.

It has now been found that desulfurization of heavy hydrocarbon materials and hydrocracking of heavy hydrocarbon materials can be accomplished in a split flow hydrogen contact process which comprises introducing a heavy hydrocarbon charge stock in downward flow into a catalyst zone, said catalyst zone comprising a first catalyst zone below and a second catalyst zone above the point of entry of the heavy hydrocarbon charge stock, introducing hydrogen into said first catalyst zone in countercurrent relationship to said heavy hydrocarbon charge stock, maintaining a lower boiling liquid in the second catalyst zone and recovering lower boiling liquids from the second catalyst zone under hydrocracking conditions of temperature, pressure and space velocity and reduced sulfur containing hydrocarbons from the first and second catalyst zones under hydrodesulfurization conditions of temperature, pressure and space velocity. It is a critical aspect of this invention that lower boiling liquid (hereinafter referred to as liquid) be maintained in the second catalyst zone. It has been found that when liquid is maintained in the second catalyst zone above the point of entry of the heavy hydrocarbon charge stock, increased hydrodesulfurization occurs under hydrodesulfurization process conditions and increased conversion and selectivity in such conversion to lower boiling hydrocarbons within a particularly preferred boiling range to lower boiling hydrocarbons are obtained under hydrocracking conditions of pressure, temperature and space velocity.

In carrying out the process of this invention, the heavy hydrocarbon charge stock is introduced into a catalyst zone herein defined to include a first catalyst zone below the point of entry of the heavy hydrocarbon charge stock and a second catalyst zone above the point of entry of the heavy hydrocarbon charge stock. By the use of the term "above" in reference to the second catalyst zone is meant only that the second catalyst zone is in upflow relationship to the flow of the hydrogen containing gas and in upflow relationship to the volatile hydrocarbon and entrained liquid hydrocarbon which proceed from the first catalyst zone into a second catalyst zone. The word "above" is used to define a flow relationship with the first catalyst zone, which relationship provides for the flow of hydrogen, volatile hydrocarbons and entrained lower boiling liquid hydrocarbons from the first catalyst zone in countercurrent relationship with the downward flow of the heavy hydrocarbon charge stock into a second catalyst zone. Thus the second catalyst zone can be located directly in a space dimension sense above the first catalyst zone such as when the first and second catalyst zones are present in a vertical reactor with an intermediate point of entry for the heavy hydrocarbon charge stock. However this invention contemplates that the second catalyst zone can be present as a separate reactor which is connected to the first reactor by conduit means although it is preferred in carrying out the process of this invention to use a vertical reactor wherein the first catalyst zone and second catalyst zone are present in the same reactor. Within the first and second catalyst zone is present a catalyst which has either hydrodesulfurization, hydrocracking or a combination of both activities under process conditions of temperature, pressure and space velocity which are utilized during the process. In addition, the catalyst in the first catalyst zone can be either the same or different than the catalyst present in the second catalyst zone. Thus, for example, the catalysts when different can be different hydrodesulfurization, different hydrocracking catalysts or a combination of a hydrodesulfurization and a hydrocracking catalyst.

The heavy hydrocarbon charge stock upon entry to the catalyst zone proceeds in downflow relationship to the first catalyst zone. Hydrogen is introduced into the first catalyst zone at the lower extremity and/or at intermediate points in said first catalyst zone in countercurrent relationship to the first catalyst zone and in upflow relationship to the volatile hydrocarbons and entrained liquid hydrocarbons which proceed into the second catalyst zone. The volatile hydrocarbons and the liquid hydrocarbons which are present in the second catalyst zone proceeds from the second catalyst zone usually in a volatile state and are recovered by conventional means such as by cooling of the hydrocarbon vapors and liquid. The hydrogen which proceeds from the second catalyst zone can then be recycled together with fresh hydrogen into the first catalyst zone. In addition, hydrogen optionally can be blended with the heavy hydrocarbon charge stock and such charge stock can be introduced at ambient temperature or higher such as temperatures up to hydrodesulfurization or hydrocracking temperatures into the catalyst zone. As stated above, it is a critical aspect of this invention that liquid be maintained in the second catalyst zone. In general, a liquid is maintained in the second catalyst zone by the rate of introduction of hydrogen into the first catalyst zone by any of the means set forth above for the introduction of hydrogen. In order to maintain liquid in the second catalyst zone utilizing hydrogen, it has been found that hydrogen rates of at least 3000 s.c.f. per barrel of liquid feed, preferably from 3000 s.c.f. per barrel of liquid feed up to about 25,000 s.c.f. per barrel of liquid feed, are required in the first catalyst zone. The hydrogen need not be pure and gases containing more than about 65 volume precent hydrogen may be used. In this connection, the term "hydrdogen" is also intended to include dilute hydrogen reformer byproduct hydrogen, hydrogen, produced by the partial oxidation of hydrocarbon materials followed by shift conversion and electrolytic hydrogen. Thus hydrogen gas streams such as from catalytic reforming units wherein the hydrogen containing off gas from the reforming unit will contain impurities such as methane and ethane are satisfactory. The rates as set forth above pertain to the actual hydrogen gas rates which are introduced into the first catalyst zone to maintain liquid presence in the second catalyst zone.

The hold-up of the liquid hydrocarbon charge stock in first catalyst zone can be varied somewhat by varying the upward flow of hydrogen. In general, it is preferred to have high liquid hold-up, that is a hold-up of hydrocarbon charge stock which provides for maximum catalytic effectiveness for the conversion of the charge stock to lower boiling hydrocarbons.

The liquid which is maintained in the second catalyst zone in general is derived from the heavy hydrocarbon charge stock and in general is a lower boiling hydrocarbon which is present initially in the heavy hydrocarbon charge stock or which is formed in carrying out the process of this invention. In general the liquid material has a boiling point below 850° F. It is preferred that the liquid which is present in the second catalyst have at least about 90% by weight of the liquid boiling below 850° F. still more preferably at least about 97% by weight and still more preferably at least about 99% by weight boiling below 850° F.

The process of this invention can be utilized for the hydrodesulfurization and the hydrocracking of heavy hydrocarbon charge stocks. By the use of the term "hydrodesulfurization process" is meant that non-destructive hydrogenation takes places whereby the main effect of carrying out the process is to remove sulfur. In carrying out the process of this invention small or negligible amounts of lower boiling hydrocarbons are obtained from the heavy hydrocarbon charge stock on a single pass basis, generally less than about 15 wt. percent 650° F.+ conversion more preferably less than about 5 wt. percent ° F.+ conversion. Hydrocracking is herein defined to be destructive hydrogenation in which a substantial portion of the product boils at a temperature below that of the heavy hydrocarbon charge stock. In general percent conversions by weight per single pass of the 850°+ material of the heavy hydrocarbon charge stock varies from about 20 to about 80% more preferably from about 30 to about 65%.

The hydrodesulfurization and hydrocracking conditions as to pressure, temperature and space velocity can be varied over a wide range, those conditions which are utilized being those which produce sulfur removal in the one case and increased yield of lower boiling hydrocarbons in the second case.

It is contemplated within the scope of this invention, that a catalyst present in the first and second catalyst zones under conditions of temperature and pressure can provide hydrodesulfurization whereas the same catalyst under different temperature and pressure conditions can provide hydrocracking of the heavy hydrocarbon material.

A wide variety of heavy hydrocarbon fractions and/or distillates can be used as a charge stock in the process of this invention. Such heavy hydrocarbon fractions include full boiling range crude oils, topped or reduced crude oils, atmospheric distillates, vacuum tower bottoms, visbreaker bottoms product, heavy cycle stock from thermal or catalytically cracked charge stocks, etc. and blends of two or more of the above charge stocks. A particularly preferred heavy hydrocarbon charge stock is the deasphalted atmospheric and vacuum tower residues which have been topped to temperatures of at least 550° F. at atmospheric pressure and those charge stocks and mixtures thereof which contain at least about 10 wt. percent 850° F.+ hydrocarbon material more preferably about 25.

The first and second catalyst zone conditions that are utilized in the split flow process of this invention are in general temperatures of from about 600° F. to about 850° F., preferably from about 725° F. to about 775° F. for hydrodesulfurization and from about 775° F. to about 825° F. for hydrocracking; pressures of from about 500 to about 5000 p.s.i.g., preferably from about 1000 to about 2000 p.s.i.g. for hydrodesulfurization and from about 1500 to about 2500 p.s.i.g. for hydrocracking and liquid hourly space velocities of from about 0.1 to about 10, preferably from about .2 to about 1.5 for hydrodesulfurization and from about .2 to about 2.0 for hydrocracking volumes of feed per volume of catalyst per hour.

In general it is preferred to have approximately the same conditions in the first and second catalyst zone although the gas rates in the first and second catalyst zone will differ depending upon the amount of hydrogen which is blended together with the heavy hydrocarbon charge stock prior to the introduction into the catalyst zone and/or consumed in the process. Thus hydrogen gas rates in the second catalyst zone may be somewhat higher than the hydrogen rates in the first catalyst zone. In addition depending upon the percent conversion and/or desulfurization per single pass a different liquid hourly space velocity in the first and second catalyst zone can be used. In general the liquid hourly space velocity in the second catalyst zone will be greater than that in the first catalyst zone. In addition as in the case where the catalyst zones are not present in the same reactor, temperature and pressure can be varied.

The hydrodesulfurization catalysts comprise any of the transitional metals, metal oxides, metal sulfides, or other metal salts which are known to catalyze hydrodesulfurization, and are not poisoned by hydrogen sulfide or other sulfur compounds. The preferred catalysts comprise the oxides and/or sulfides, as for example the oxides or sulfides of molybdenum, tungsten, iron, cobalt, nickel, chromium and the like. Vanadium compounds may also be employed in some cases. A particularly active combination consists of a group VIB metal oxide or sulfide with a group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate, which actually may be a mixture of cobalt and molybdenum oxides wherein the atomic ratio of Co to Mo may be between about 0.4 and 5.0. This catalyst, or any of the above catalysts may be employed in unsupported form, or alternatively it may be distended on a suitable adsorbent oxide carrier such as alumina, silica, zirconia, thoria, magnesia, titania, bauxite, acid-activated clays, or any combination of such materials.

The hydrocracking catalyst utilized for the conversion of the aforementioned hydrocarbon charge stocks can be crystalline metallic alumino-silicate zeolite, having a platinum group metal (e.g. platinum or palladium) deposited thereon or composited therewith. These crystalline zeolites are characterized by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry of certain molecular structures. It has been found that crystalline alumino-silicate zeolites, having effective pore diameter of about 6 to 15, preferably 8 to 15 angstrom units, when composited with the platinum group metal, and particularly after base exchange to reduce the alkali metal oxide (e.g. $Na_2O$) content of the zeolite to less than about 10 wt. percent, are effective hydrocracking catalysts, particularly for the hydrocarbon charge stocks herein contemplated.

In addition, the catalyst can be a supported hydrogenation catalyst comprising a Group VIII metal in the Periodic Table, such as nickel, cobalt, iron or one of the platinum group metals such as palladium, platinum, iridium, or ruthenium on a suitable support. Generally, it is preferred that an oxide or sulfide of a Group VIII metal (particularly iron, cobalt or nickel) be present in mixture with an oxide or sulfide or a Group VI-B metal (preferably molybdenum or tungsten). Suitable carriers or supports include acidic supports such as: silica-alumina, silica-magnesia, and other well-known cracking catalyst bases; the acidic clays; fluorided alumina; and mixtures of inorganic oxides, such as alumina, silica, zirconia, and titania, having sufficient acidic properties providing high cracking activity.

In addition the various metals and metal oxides and sulfides can be utilized on a mixture of support materials. Thus, for example, a zeolite and an alumina can be blended together as a support material in varying proportions which support materials contain various metals deposited thereon.

The invention can be better appreciated by the following non-limiting examples.

EXAMPLE 1

To a 1500-cc. split flow vertical pressure reactor equipped with charge stock inlet tube at the intermediate point in said reactor, effluent exit tubes at the bottom and top of the reactor, a gas inlet tube at the bottom of the reactor, a first and second fixed screen catalyst bed containing 300 ccs. each of catalyst below and above the charge stock inlet tube respectively, each catalyst bed containing a nickel oxide (3 wt. percent), molybdenum oxide (13.6 wt. percent) on alumina (1/16" pellets) catalyst, and heating means is charged a Safaniya atmospheric reduced crude the properties of which are listed in Table I at a temperature of approximately 200° F. in downflow relationship to the first hydrogenation catalyst bed at a space velocity of volumes of liquid per volume of catalyst per hour of 1.0. Hydrogen is introduced through the gas inlet tube in countercurrent relationship to the charge stock at a rate of 16,000 s.c.f. per barrel liquid feed and a temperature of 775° F. and a pressure of 1500 p.s.i.g. are maintained in the first and second catalyst beds. A product (effluent) is recovered from the first and second catalyst zones and combined.

EXAMPLE 2

To a downflow reactor equipped with a charge stock and hydrogen inlet tube and product (effluent) exit tube at the top and bottom of the reaction respectively utilizing a catalyst and charge stock as described in Example 1, is introduced hydrogen and the charge stock in downflow relationship to the catalyst at a liquid hourly space velocity of 1.0, a temperature of 775° F., a pressure of 1500 p.s.i.g. and a hydrogen gas rate of 16,000 s.c.f. per barrel liquid feed. The product (effluent) is recovered.

EXAMPLE 3

To a counterflow reactor equipped with a charge stock inlet and gas exit tubes at the top of the reactor and gas inlet and effluent exit tubes at the bottom of the reactor utilizing a catalyst and charge stock as described in Example 1, is introduced hydrogen and the charge stock in countercurrent relationship to the catalyst at a liquid hourly space velocity of 1.0, a temperature of 775° F., a pressure of 1500 p.s.i.g. and a hydrogen gas rate of 16,000 s.c.f. per barrel liquid feed. The product (effluent) is recovered.

The analysis of the recovered product from Examples 1, 2 and 3 are given in Table I together with the properties of the charge stock.

TABLE I

| Mode of operation | Safaniya reduced crude charge stock | Example 1 countercurrent split flow | Example 2 downflow | Example 3 countercurrent |
|---|---|---|---|---|
| Product recovery,[1] wt. percent: | | | | |
| $H_2S+NH_3$ | | .5 | .4 | .4 |
| $C_1$ | | .3 | .6 | .2 |
| $C_3$ | | .2 | .5 | .2 |
| $C_4$'s | | .2 | .6 | .2 |
| $C_5$'s | | .2 | .8 | .2 |
| $C_6$–200° F. | | .4 | .9 | 1.4 |
| 200°–400° F. $\}C_6$–400° F. | | 11.8 } 12.2 | 1.4 } 2.3 | -------- |
| 400°–650° F. | 1.5 | 26.5 | 6.3 | 14.0 |
| 650°–850° F. | 20.3 | 13.3 | 14.6 | 21.3 |
| 850° F.+ | 78.2 | 46.3 | 73.4 | 61.9 |
| Sulfur, wt. percent | 4.5 | 1.23 | 2.5 | 2.39 |
| Desulfurization, wt. percent | | 72.7 | 44.5 | 46.9 |
| 850° F.+ conversion, wt. percent | | 40.3 | 6.2 | 20.8 |

[1] Hydrogen free basis on total combined overhead and bottoms product.

EXAMPLE 4

To a reactor as described in Example 1 wherein the first bed contains 300 ccs. of a nickel oxide (3 wt. percent), molybdenum oxide (13.6 wt. percent) on alumina (1/16") catalyst and the second catalyst bed contains a nickel oxide (6 wt. percent) tungsten oxide (19 wt. percent) on a support comprising 22% low sodium zeolite, 56% silica and 20% alumina on a weight basis, is introduced an Arabian vacuum reduced crude oil having the properties listed in Example 7 in downflow relationship to the first hydrogenation catalyst bed at a liquid hourly space velocity of 1.0. A temperature of 775° F., a pressure of 1500 p.s.i.g. and a hydrogen circulation rate of 18,000 s.c.f. per barrel liquid feed are maintained in the first and second hydrogenation catalyst beds. A product boiling below 850° F. is recovered from the second catalyst zone.

EXAMPLE 5

To a reactor as described in Example 1 wherein the first bed contains 300 ccs. of a nickel sulfide (3.7 wt. percent), molybdenum sulfide (18.1 wt. percent) on alumina (1/16") catalyst and the second catalyst bed contains a nickel oxide (6 wt. percent) tungsten oxide (19 wt. percent) on a support comprising 22% low sodium zeolite, 56% silica and 20% alumina on a weight basis, is introduced an Arabian vacuum reduced crude oil having the properties listed in Example 7 in downflow relationship to the first hydrogenation catalyst bed at a liquid hourly space velocity of 1.0. A temperature of 775° F., a pressure of 1500 p.s.i.g. and a hydrogen circulation rate of 18,000 s.c.f. per barrel liquid feed are maintained in the first and second hydrogenation catalyst beds. A product boiling below 850° F. is recovered from the second catalyst zone.

EXAMPLE 6

To a reactor as described in Example 1 wherein the first and second catalyst bed contain 300 ccs. each of a nickel oxide (6 wt. percent) tungsten oxide (19 wt. percent) on a support comprising 22% low sodium zeolite, 56% silica and 20% alumina on a weight basis, is introduced an Arabian vacuum reduced crude oil having the properties listed in Example 7 in downflow relationship to the first hydrogenation catalyst bed at a liquid hourly space velocity of 1.0. A temperature of 775° F., a pressure of 1500 p.s.i.g. and a hydrogen circulation rate of 18,000 s.c.f. per barrel liquid feed are maintained in the first and second hydrogenation catalyst beds. A product boiling below 850° F. is recovered from the second catalyst zone.

EXAMPLE 7

To a reactor as described in Example 1 wherein the first and second catalyst bed contain 300 ccs. each of a nickel oxide (3 wt. percent), molybdenum oxide (13.6 wt. percent) on alumina (1/16") catalyst is introduced an Arabian vacuum reduced crude having properties as follows:

Stock name: Arabian vacuum reduced crude
- ° API _____ 8.7
- Carbon residue, wt. percent _____ 17.55
- Sulfur, wt. percent _____ 3.4
- Nitrogen, wt. percent _____ .28
- DPI Flask Dist., wt. percent:
  - IBP—400° F. _____ ____
  - 400–650° F. _____ ____
  - 650–850° F. _____ ____
  - 850—EP _____ 100 in downflow relationship to the first hydrogenation catalyst bed at a liquid hourly space velocity of 1.0. A temperature of 775° F., a pressure of 1500 p.s.i.g. and a hydrogen circulation rate of 17,500 s.c.f per barrel liquid feed are maintained in the first and second hydrogenation catalyst beds. A combined product is recovered from both the first and second catalyst zones.

EXAMPLE 8

To a reactor as described in Example 1 wherein the first and second catalyst bed contain 300 ccs. each of a nickel oxide (3 wt. percent), molybdenum oxide (13.6 wt. percent) on alumina (1/16") catalyst is introduced an Arabian vacuum reduced crude having the properties listed in Example 7 in downflow relationship to the first hydrogenation catalyst bed at a liquid hourly space velocity of 1.0. A temperature of 775° F. a pressure of 1500 p.s.i.g. and a hydrogen circulation rate of 1600 s.c.f. per barrel liquid feed are maintained in the first and second hydrogenation catalyst beds. A combined product is recovered from the first and second catalyst zones.

The properties of the combined product from Examples 7 and 8 are given in Table II.

TABLE II

| | Product from— | |
|---|---|---|
| | Ex. 7 | Ex. 8 |
| Hydrogen circulation rate, s.c.f./bbl | 17,500 | 1,600 |
| Product analysis, wt. percent: | | |
| Sulfur | 1.22 | 2.09 |
| Carbon residue | 7.93 | 12.52 |
| Nitrogen | 0.15 | 0.25 |
| Desulfurization | 64.1 | 38.5 |

The results in Table I demonstrate the outstanding performance of the process of this invention for providing conversion of 850 F.+ material on a single pass basis as compared to the countercurrent method of Example 2 and the downflow method of Example 3. In addition the desulfurization which is obtained under hydrocracking conditions is considerably in excess of that obtained by any of the two prior methods. Thus, in Example 1, a 40.3 wt. percent conversion of 850 F.+ material was obtained which is 100 percent greater conversion than the countercurrent method and almost 700 percent greater conversion when compared to the downflow method. In addition, the desulfurization was twice that of the countercurrent and downflow method. Of particular importance in demonstrating that liquid presence is essential in order to obtain optimum desulfurization are the results listed in Table II. More particularly, a comparison between Example 7 and Example 8 demonstrate a critical aspect of this invention that is, the maintaining of a lower boiling liquid in the second catalyst zone. Thus a comparison in hydrogen circulation rates of 17,500 s.c.f. per barrel for the process of this invention and 1600 s.c.f. per barrel for the prior art method gives a desulfurization by the process of this invention of 64.1 percent versus a desulfurization by the prior art method of 38.5. Thus the process of this invention provides for desulfurization almost twice as great as the prior art method.

While this invention has been described with respect to various specific examples and embodiments it is to be understood that the invention is not limited thereto and that it can be variously practiced within the scope of the following claims.

We claim:
1. In a hydrogen desulfurization process wherein a sulfur-containing heavy petroleum hydrocarbon charge stock is introduced in liquid phase into a catalyst zone at an intermediate point thereof, said catalyst zone comprising a first hydrodesulfurization catalyst zone below and a second hydrodesulfurization catalyst zone above said intermediate point and maintained at a temperature between about 600 and 850° F. and a pressure between about 500 and 5000 p.s.i.g., and said hydrocarbon charge stock is passed through said first catalyst zone in downward flow, the improvement which comprises maintaining lower boiling petroleum hydrocarbon liquid in said second catalyst zone by introducing into said first catalyst zone to flow upwardly serially through said first and second catalyst zones a stream of hydrogen at a rate of at least 3000 s.c.f. per barrel of sulfur-containing heavy petroleum hydrocarbon charge stock and recovering petroleum hydrocarbon liquid of reduced sulfur content.

2. A process of claim 1 wherein the lower boiling liquid is maintained in the second catalyst zone by a hydrogen gas rate of at least 3,000 s.c.f. per barrel.

3. A process of claim 1 wherein the lower boiling liquid has at least about 97% by weight of the liquid boiling below 850° F.

4. A process of claim 2 wherein the lower boiling liquid has at least about 99% by weight of the liquid boiling below 850° F.

5. The process of claim 1 in which at least 10% by weight of the sulfur-containing heavy petroleum hydrocarbon charge stock boils above about 850° F.

6. The process of claim 1 in which each hydrodesulfurization catalyst comprises a member selected from the group consisting of (a) nickel and molybdenum (b) cobalt and molybdenum (c) nickel and tungsten and (d) compounds thereof.

7. The process of claim 6 in which each hydrodesulfurization catalyst comprises a compound of nickel and a compound of molybdenum.

8. The process of claim 5 in which the hydrocarbon charge comprises a reduced crude.

References Cited
UNITED STATES PATENTS

| 3,186,935 | 6/1965 | Vaell | 208—59 |
| 3,211,641 | 10/1965 | Halik et al. | 208—59 |

DELBERT E. GANTZ, Primary Examiner

R. M. BRUSKIN, Assistant Examiner

U.S. Cl. X.R.

208—89